US006525252B1

(12) United States Patent
Klausen et al.

(10) Patent No.: US 6,525,252 B1
(45) Date of Patent: Feb. 25, 2003

(54) DEVICE FOR COMPOSING AND ARRANGING MUSIC

(75) Inventors: Ulrich Klausen, Frederiksberg (DK); Bertel Kragelund Brodersen, Aalborg (DK); Hans Harding, Aalborg (DK)

(73) Assignee: Innoplay APS, Aalborg Øst (DK)

( * ) Notice: Subject to any disclaimer, the term of this patent is extended or adjusted under 35 U.S.C. 154(b) by 0 days.

(21) Appl. No.: 09/980,683

(22) PCT Filed: Jun. 8, 2000

(86) PCT No.: PCT/DK00/00309

§ 371 (c)(1), (2), (4) Date: Feb. 26, 2002

(87) PCT Pub. No.: WO00/77770

PCT Pub. Date: Dec. 21, 2000

(30) Foreign Application Priority Data

| | | |
|---|---|---|
| Jun. 9, 1999 | (DK) | 1999 00816 |
| Nov. 26, 1999 | (DK) | 1999 01698 |
| Dec. 13, 1999 | (DK) | 1999 01779 |
| Jan. 20, 2000 | (DK) | 2000 00094 |

(51) Int. Cl.$^7$ ........................... G09B 15/04; G01H 1/34

(52) U.S. Cl. ............................. 84/600; 84/644; 84/670; 84/477 R; 84/DIG. 6

(58) Field of Search .......................... 84/600, 644, 670, 84/718–721, 743–746, DIG. 7, 477 R, 478, 479 R, 479 A, DIG. 6

(56) References Cited

U.S. PATENT DOCUMENTS

| | | |
|---|---|---|
| 3,447,249 A | 6/1969 | Greger |
| 4,043,559 A | 8/1977 | Eigen et al. |
| 4,391,447 A | 7/1983 | Dudley |
| 4,651,613 A | 3/1987 | Harrison |
| 4,936,185 A | 6/1990 | Yamaguchi et al. |
| 5,013,047 A | 5/1991 | Schwab |
| 5,349,129 A * | 9/1994 | Wisniewski et al. |
| 5,853,327 A | 12/1998 | Gilboa |

FOREIGN PATENT DOCUMENTS

| | | |
|---|---|---|
| DE | 36 42 653 A1 | 4/1988 |
| GB | 2 186 731 A | 8/1987 |

* cited by examiner

*Primary Examiner*—Stanley J. Witkowski
(74) *Attorney, Agent, or Firm*—Harness, Dickey & Pierce, PLC

(57) ABSTRACT

A device for composing and arranging music comprising a sensor part and a plurality of blocks which may be releasably connected to the sensor part. A distribution of blocks, each belonging to one of a number of sub-populations of blocks on the sensor part, represents a composition or arrangement comprising musical features being dependant upon the sub-population(s) and the position of the block(s). Further, a device for building an instrument using blocks having activating means for activating the musical features of the block(s). The device may be used as an educational toy being easy to use for e.g. children. The device may be connected to a computer and to a global computer network so as to enable the device to communicate with other similar devices.

29 Claims, 4 Drawing Sheets

DEVICE FOR COMPOSING AND ARRANGING MUSIC

Figure 1:
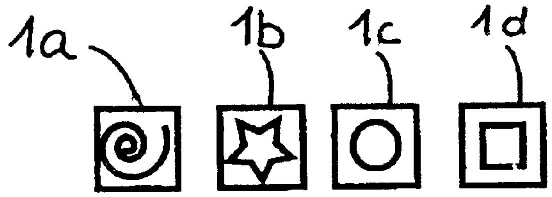

This application is the national phase under 35 U.S.C. § 371 of PCT International Application No. PCT/DK00/00309 which has an International filing.date of Jun. 8, 2000, which designated the United States of America and was published in English.

The present invention relates to the field of composing and arranging music. More particularly it relates to composing and arranging music using a computer device, and to playing the composed and/or arranged music in accordance with a specific physical representation of the music.

It is known to create music while using a computer, e.g. by connecting a piano like keyboard to the computer. When the keys of the keyboard are activated the computer may note which key or keys has/have been struck. It may then play and/or record the corresponding tone and/or it may produce a graphical representation, typically musical notes/sheet music, and the graphical representation may be stored and/or printed.

It is also known to use various detection means for detecting the presence of a certain game piece in a certain position. This has mainly been used in computer games, typically in board games, such as chess or checkers, being played on a computer. Such arrangements have been disclosed in U.S. Pat. Nos. U.S. Pat. No. 5,853,327 to Gilboa, U.S. Pat. No. 5,013,047 to Schwab and U.S. Pat. No. 4,391,447 to Dudley. U.S. Pat. No. 5,853,327 discloses a computerised game board, wherein it is possible to keep track of a number of toy figures on the game board by means of transponders being positioned in the toy figures. The information is transferred to a computer, so that the movement of a toy figure corresponds to the movement of a virtual figure of a computer game. U.S. Pat. No. 5,013,047 and U.S. Pat. No. 4,391,447 both disclose computerised board games, where it is possible to keep track of a number of game pieces being positioned on the board. The inventions of these references are particularly suited for positional games, such as chess or checkers.

U.S. Pat. No. 4,936,185 to Yamaguchi et al. discloses an electronic musical instrument comprising a plural number of component blocks being capable of being coupled mechanically and electrically in succession. When the blocks are connected either the time range of a tone or a tone range of the tones generated from the instrument is changed.

It is an object of the present invention to provide a device for composing and arranging music which is easy to use, so that e.g. children may use it, and so that it may be used as an educational toy. It is a further object of the present invention to provide an instrument building device which is flexible, so as to allow the user to build an unconventional instrument, and so as to support and enhance the creativity of the user.

Thus, according to the present invention is provided a device for composing and arranging music comprising

- a sensor device having a plurality of receiving positions arranged in a two-dimensional array of which one dimension represents a temporal domain of the music,
- a plurality of blocks each being suitable for being releasably arranged at each of the receiving positions, each of the blocks belonging to one of a plurality of sub-populations of blocks and having features being detectable by detecting means for detecting to which of the plurality of sub-populations of blocks a block arranged at a receiving position belongs as well as the position of said receiving position and for producing an output accordingly, wherein each block represents a predetermined musical feature, said representation being dependent upon the sub-population to which the block belongs as well as the position of the block on the sensor device along the second dimension of the two-dimensional array, the device further comprising
- play-back means for playing music according to the detected positions and features of the block(s) arranged at the sensor device as well as according to the predetermined musical features.

The two dimensions of the two-dimensional array preferably arranged at least substantially perpendicularly to each other, but they may alternatively be arranged with any other suitable angle in respect to each other.

The temporal domain of the music is represented by the one dimension in such a way that when moving in a specific direction along this dimension (e.g. from left to right, from right to left or in an up/down direction), the musical representation corresponds to the music being played in the correct order, in a correct tempo etc. That is, a certain position along this dimension represents a certain point in time of the music. One unit of the temporal dimension may represent a single note/beat or it may represent a measure or part of a song or even a complete song. Alternatively or additionally one unit may represent “piece A” of a song while another unit represents “piece B”, the two pieces not necessarily being of the same length.

The blocks may be releasably arranged at the receiving positions by means of gripping means placed on each of the.blocks, where each receiving position comprises receiving means adapted for engaging with the gripping means of the blocks. Such gripping means may comprise mechanical gripping means, e.g. similar to the ones known from the building bricks manufactured by LEGO®, or similar to snap fasteners. Alternatively or additionally it may comprise any other suitable kind of gripping means, such as self adhesive tape, velcro® or similar gripping means.

Blocks belonging to the different sub-populations.are most preferably distinguishable from each other by visible characteristics, such as different colour, different shape or different patterns being drawn and/or stamped onto the blocks. Alternatively or additionally the blocks may be distinguishable from each other by characteristics which may be felt, such as different shapes or different patterns being stamped onto the blocks. In this case the differences may also be sensed by persons being visually handicapped or even by blind persons. Preferably the number of sub-populations is finite, most preferably less than 10, but there may be a larger number of sub-populations, and the number may even be infinite.

The features being detectable by detecting means may be the resistance of a resistor being positioned on the block, or it may be a pattern (e.g. a picture and/or a bar code or any other suitable pattern) which may be recognised by the detecting means, or it may be a transponder being positioned on the block or it may be any other suitable detectable feature.

The produced output may be an electrical or electronical output, such as a current signal or a voltage signal. It may alternatively be an electromagnetic signal, such as a visible, an infra-red and/or an ultra-violet signal, or even an X-ray signal. Alternatively or additionally the output may comprise an acoustic signal, such as a sound signal. The output should be significant of the block which has been detected and of the position of this block on the sensor device.

The predetermined musical feature may be a single note, a beat, or a certain musical phrase being played by a certain instrument or any other suitable musical feature.

The play-back means most preferably comprises one or more loudspeaker(s) and control means for controlling the output of the loudspeakers. The play-back means may comprise a tape recorder, a compact disc (CD) recorder and/or any other suitable kind of play-back means. The control means preferably comprises an amplifier.

The detecting means may be arranged on the sensor device at each receiving station. In this case the detectable features are directly detected when a block is arranged at a certain receiving position. Alternatively the detecting means may be arranged in a central position of the sensor device.

The play-back means may form a part of the sensor device. It may be a separate part of the sensor device or it may be an integrated part. Alternatively, it may be an external device, e.g. forming part of an external computer device or an external audio and/or video system.

The device may further comprise recording means for recording and storing music according to the detected positions and features of the block(s) arranged at the sensor device as well as according to the predetermined musical features. Such recording means may be a part of the play-back means, the play-back means thereby forming a device being similar to a regular tape recorder. The recording medium may be magnetic tape, a compact disc (CD), a permanent storage means (such as the hard disc of a computer device), a video tape, a DAT tape, a DVD disc, or any other suitable recording medium. The actual music may be recorded and/or a representation of the music, such as information regarding the position of the blocks or sheet music (such as the score of the music) corresponding to the music may be recorded.

Different positions along the second dimension of the two-dimensional array may represent different musical instruments, such as drums/percussion, bass, violin, guitar, piano, vocal, chorus etc. Two or more positions may represent the same instrument. For instance there may be one position representing the lead vocal and another position representing another vocal adding an upper part to the music, or there may be one position representing the first violins and another representing the second violins of an orchestra. This corresponds to having more than one of a certain kind of instrument in a band or orchestra.

The predetermined features represented by each block may be defined for each composition or arrangement of music. In this case the features may be "programmed" by the user every time a composition or arrangement is being created. For instance the user may record a vocal or instrumental sequence and define that this specific vocal or instrumental sequence corresponds to a block belonging to a specific sub-population (such as a red block) being positioned in a specific position along the second dimension (such as position three). Thus, in this case the user is completely in control of the arrangement/composition.

Alternatively, the predetermined features of at least some of the blocks may be globally determined. In this case the removal of a certain block results in the removal of the corresponding musical feature from the composition or arrangement. In this case it may be possible to acquire blocks (and the knowledge of how to position these blocks) according to a certain musical composition/arrangement, e.g. a popular song or an orchestral piece of music. The removal of a specific block will then result in the removal of the corresponding musical feature. It may thus be possible to remove, e.g., the bass part or the vocal part from a composition/arrangement. In this way a piece of music may be "dissected" into musical components, thereby providing an educational toy, where it is possible to learn from where a certain sound/component etc. of the music originates.

The detecting means may comprise means for detecting the resistance of a resistor. In this case each block comprises a resistor, the resistance of which is significant of the sub population to which the block belongs.

The sensor device may be suitable for being releasably connected to another substantially identical sensor device, so as to allow for an extension of the sensor device in at least one of the two dimensions. Preferably, the sensor device may be extended along the first dimension representing the temporal domain of the music. Alternatively or additionally, the sensor device may be extended along the second dimension. In this case it may be possible to add additional instruments to the "orchestra". In case the play-back means forms a separate part of the sensor device, the extension may be performed by adding only a part comprising a number of receiving positions, the original sensor device and the added part sharing the play-back means belonging to the original sensor device.

Each block may be suitable for being releasably connected to at least one other block, so that two or more blocks may be positioned at the same receiving position. The blocks may be connected to each other in such a way that when they are arranged at the sensor device they extend in a direction being at least substantially normal to-the plane defined by the two-dimensional array of the receiving positions. Alternatively or additionally they may be connected to each other in another direction, or the receiving positions may simply be adapted for receiving more than one block, e.g. by the area occupied by a receiving position being substantially larger than the area being occupied by a block when the block is arranged at a receiving position. Preferably, the blocks may be interconnected by means of gripping means, the gripping means most preferably being identical or at least very similar to the gripping means used for arranging the blocks at the receiving positions, in which case the blocks also comprise receiving means for receiving the gripping means of another block. In case the detectable features comprises a resistor being positioned on each block, the presence of more than one block at a receiving position should result in the resistors of the two or more blocks being coupled in a parallel or serial coupling, whereby the detecting means is capable of detecting how many blocks are present at the receiving position.

The presence of two or more blocks at the same receiving position may represent an increase in the volume of the predetermined musical feature. It may alternatively or additionally result in the musical feature being played at one or more octaves above or below the musical feature being represented by the presence of one block, or it may represent any other suitable change in the musical feature.

The device may further comprise data communication means for establishing a temporary or permanent connection to an external computer device, such as a personal computer (PC) or a terminal being connected to a main frame system or any other suitable external computer device. The external computer device may comprise at least part of the play-back means of the device. The data communication means may comprise one or more electrical chord(s), such as an ordinary chord or a so-called bus, or it may be adapted for establishing a chord-less connection, such as an infra-red connection.

The external computer device is preferably adapted for converting the musical features represented by the blocks on the sensor device into a graphical presentation of the musical features, the graphical presentation being presented by presenting means connected to the external computer device. The graphical presentation may be in the form of musical notes/sheet music. Alternatively or additionally it may be in the form of other graphical symbols being-easier to learn and/or remember. This way it may be easier for children, persons who are unfamiliar with reading music, or even persons having learning disabilities such as dyslexia to comprehend the graphical presentation and/or translate it into actual music. This way an educational toy is provided.

The presenting means may comprise a monitor, such as an ordinary monitor being connected to the computer device, and/or it may comprise a printing device, such as a printer, a plotter, a telefax and/or any other suitable printing device.

The external computer device may be adapted for being at least temporarily connected to a global computer network. The global computer network may e.g. be the internet. The external computer device may be connected to the global computer network via a telecommunication network, such as by means of a modem or by means of a separate connection, such as an ISDN connection or by means of any other suitable connection.

The sensor device may be adapted for communicating with another substantially identical sensor device via the global computer network. The other sensor device is preferably also connected to an external computer device being at least temporarily connected to the global computer network, so that the two external computer devices may communicate with each other, or so that the two sensor devices may communicate via the two external computer devices.

According to another aspect of the present invention is provided a device for composing and arranging music comprising a sensor device, a plurality of blocks each belonging to one of a plurality of sub-populations of blocks and having features being detectable by detecting means arranged at the sensor device for detecting to which of the plurality of sub-populations of blocks a block being connected to said sensor device belongs and for producing an output accordingly, each block being suitable for being releasably connected to at least one other block, at least one connecting part for connecting one or more blocks to the sensor device, so as to transfer information relating to the block(s) from the block(s) to the sensor device, wherein each block represents a predetermined musical feature, said representation being dependant upon the sub-population to which the block belongs and each block comprises activating means, the device further comprising play-back means for playing music according to the detected features of the block(s) connected to the sensor device as well as according to the predetermined musical features.

The connecting part may comprise an electrical chord, such as e.g. an ordinary electrical chord or a so-called bus, so that electrical signals may be transferred between the block(s) and the sensor device. It may alternatively comprise means for generating and means for receiving an electromagnetic signal, such as a visible, an infra-red or an ultraviolet signal, or means for generating and means for receiving an acoustic signal, so that information may be chordlessly transferred between the block(s) and the sensor device.

The activating means may be electrical, mechanical, electromagnetic and/or any other suitable kind of activating means. They may be activated by pushing, pulling, blowing air into, plucking and/or in any other suitable way. They may even be activated by means of voice recognition. The activating means may be significant for each sub-population of blocks.

Two or more blocks being connected to each other and to the sensor device may constitute a musical instrument, each block representing a key of the instrument, the key being activated when the activating means of the corresponding block is activated. The “instrument” may thus be “played” by activating the activating means of the blocks.

The device may further comprise data communication means for establishing a temporary or permanent connection to an external computer device as described above.

The external computer device may be adapted for converting the musical features represented by the blocks connected to the sensor device into a graphical presentation of the musical features, the graphical presentation being presented by presenting means connected to the external computer device. This is preferably done in a way similar to the one described above.

The presenting means may comprise a monitor and/or it may comprise a printing device, such as an ordinary printer, a plotter or any other suitable printing device.

The external computer device may be adapted for being at least temporarily connected to a global computer network, and it may be adapted for communicating with another substantially identical sensor device via the global computer network as described above.

In the following is described a preferred embodiment of the present invention.

EXAMPLE: THE MUSICAL BLOCK SYSTEM

The embodiment described is a method of creating soundscapes and musical compositions, which is incorporated in the concept of building blocks. The way in which the building blocks are placed creates a unique soundscape. The method is based on a modular structure of musical elements.

The technology behind The musical block system is based on the ability of the computer technology to generate sounds, sequences and whole music pieces in a simple and easy way.

The Musical Brick

The block is the “building stone” in the process of creating music. It represents a note, a rhythm, a melodic sequence or other musical parameters. The blocks can have many shapes and colours, but first and foremost the ability to be stacked vertically.

The Plate Part

The plate part is the object to which the blocks are attached. It is a two-dimensional array where one axis equals time, and the other one determines which instrument/sample track to activate. The plate is connected to a sensor part.

The Sensor Part

The sensor part is able to determine where the blocks are placed on the plate part, and which type they are. Computing this information the sensor device builds the soundscape/musical pieces of the musical elements on several levels.

This can be:

Song mode, for creating a whole song

Pattern mode, for experimenting with rhythm structures or certain melodic riffs

Sample mode, for recording real sounds and assigning t hem to a certain block.

The sensor part is equipped with a limited number of buttons to control play-back, recording, mode selection, volume and a few other features. It is equipped with a microphone and a loudspeaker. Furthermore the sensor part has the ability to be connected to a computer or to a storage media.

Sensor Bricks

The sensor blocks is an add-on feature, which allows the user to create instruments using simple blocks. There are different-types of sensor blocks; roll-sensors, pluck-sensors, air pressure sensors and sensor blocks responding to pressure sensitivity. These sensor blocks make it possible to recreate almost any of the existing instruments, and to develop new ones.

Figure 2:
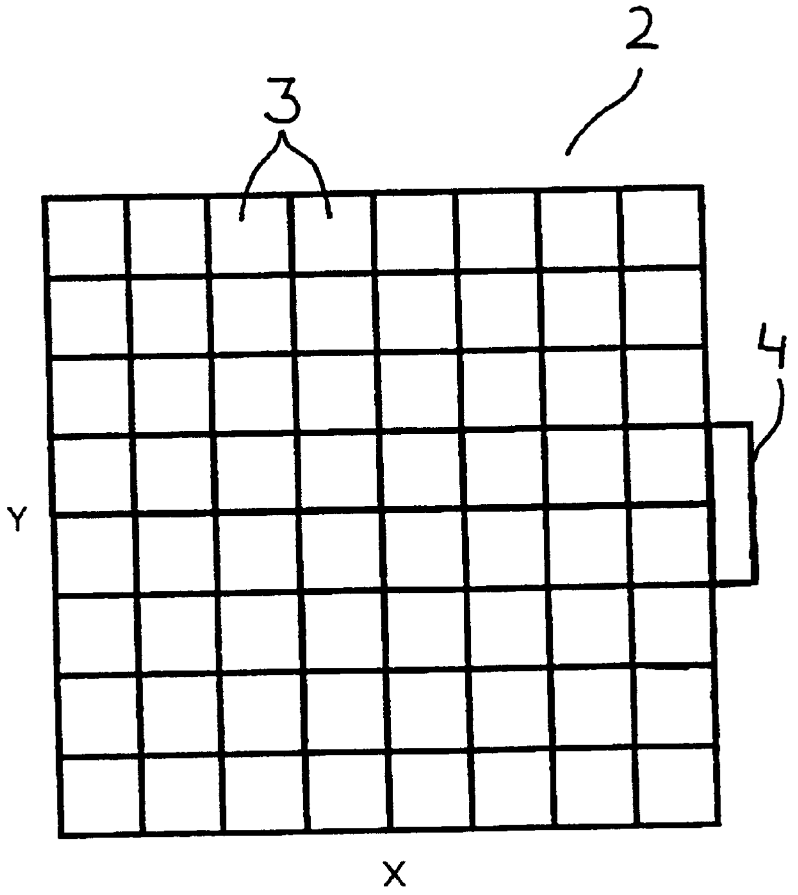
Figure 3:
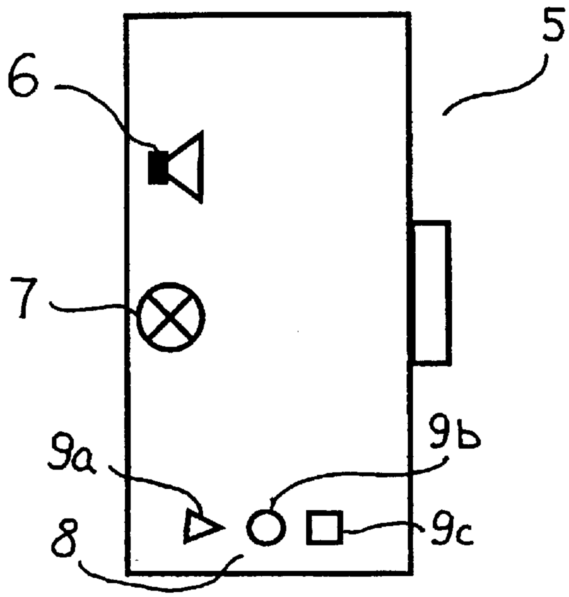
Figure 4:
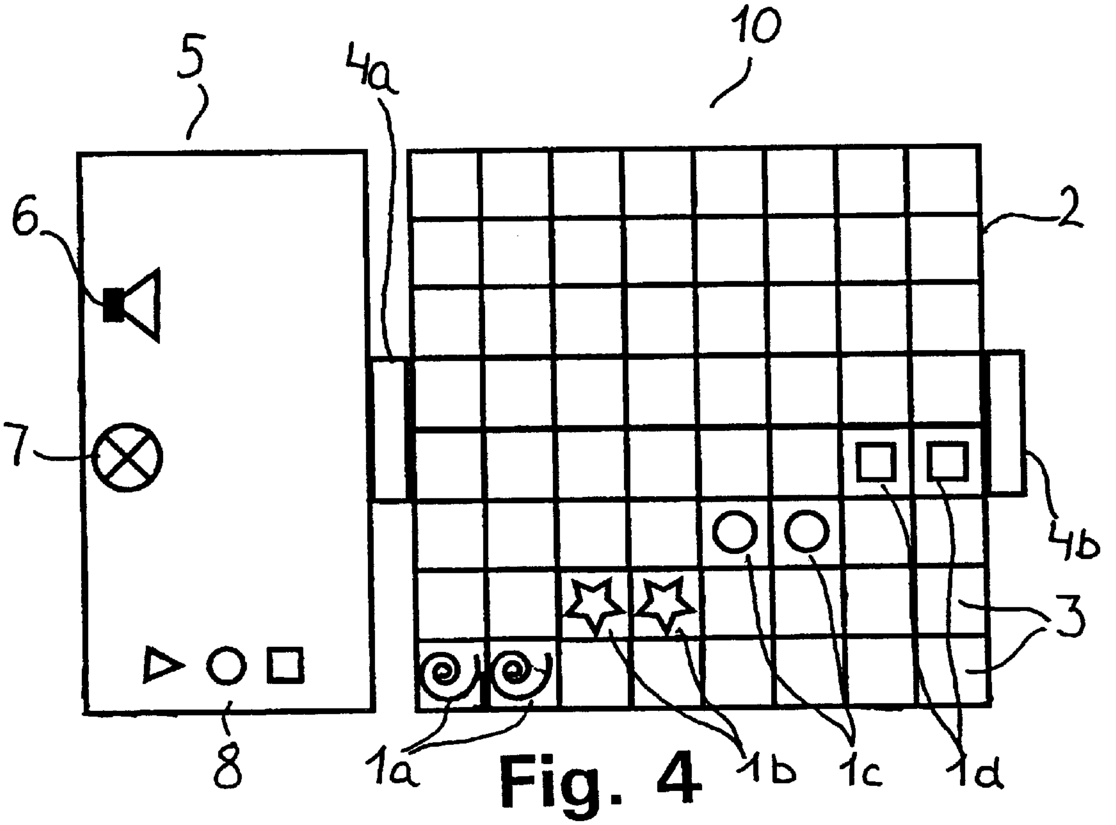
Figure 5:
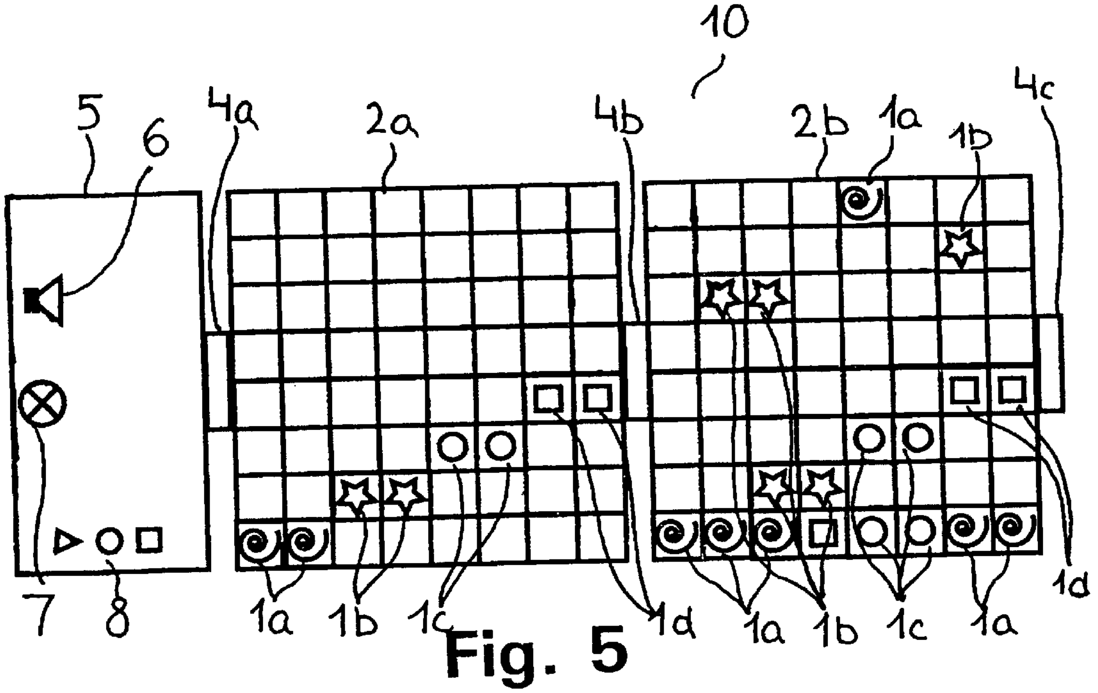
Figure 6:
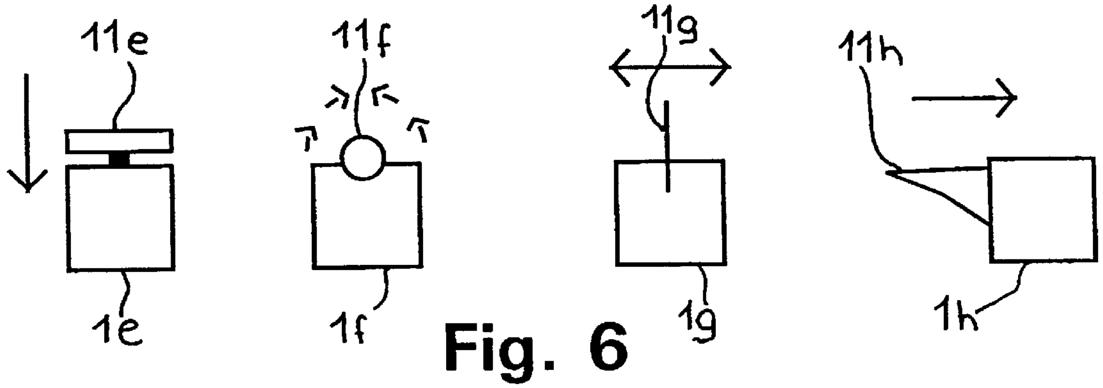
Figure 7:
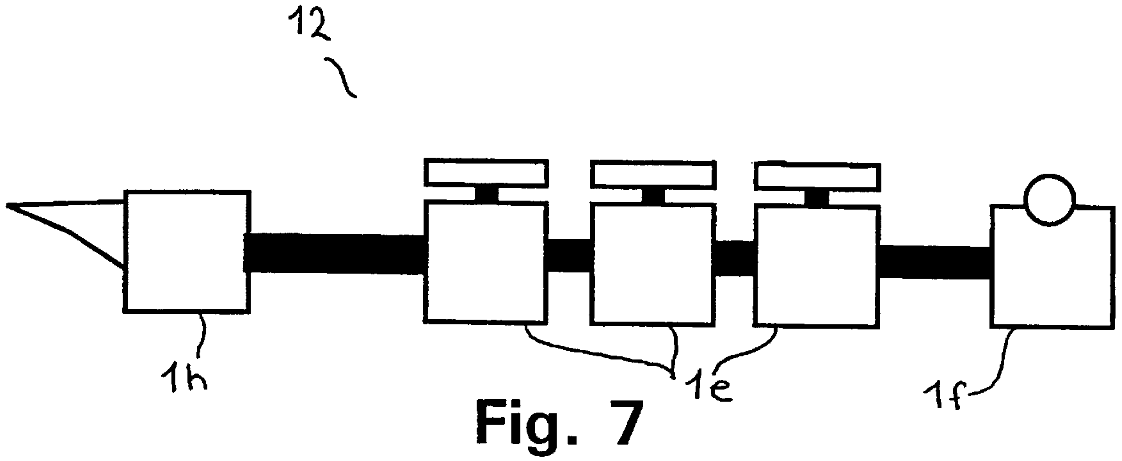
Figure 8:
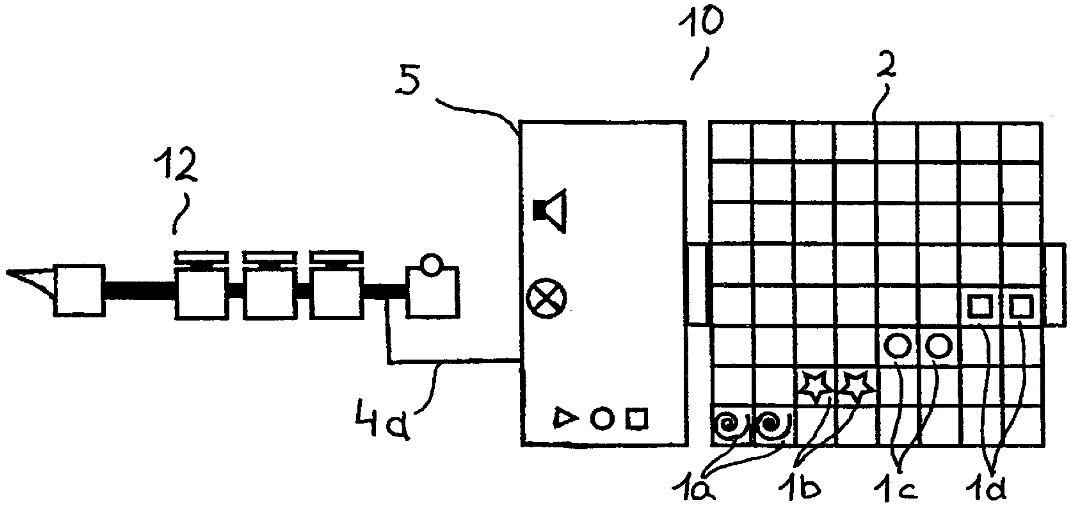

The invention will now be further described with reference to the accompanying drawings in which FIG. 1 shows four different blocks belonging to four different sub-populations according to one aspect of the invention, FIG. 2 shows a plate part of a sensor device, FIG. 3 shows a sensor part of a sensor device, FIG. 4 shows a sensor device with a sensor part and a plate part, and with blocks positioned on the plate part, FIG. 5 shows the same as FIG. 4, but with two plate parts, FIG. 6 shows four different blocks belonging to four different sub-populations according to another aspect of the invention, FIG. 7 shows an instrument which is made from a number of blocks according to the embodiment of FIG. 6, and FIG. 8 shows the instrument of FIG. 7 connected to a sensor part of a sensor device, the sensor part in turn being connected to a plate part having a number of blocks arranged on it.

FIG. 1 shows four different blocks 1*a–d* belonging to four different sub-populations indicated by the four different symbols of blocks 1*a–d*, thereby making them distinguishable. The musical features which the blocks 1*a–d* belonging to the different sub-populations represent, may be determined in advance, i.e. globally. Alternatively or additionally it may be possible for the user to define these features, e.g. by recording a piece of vocal music or by playing a musical sequence on an instrument.

FIG. 2 shows a plate part 2 of a sensor device, the plate part 2 having a number of receiving positions 3 arranged in a two-dimensional array. The two dimensions of this array are indicated by "X" and "Y", respectively. The "X" dimension represents the time domain. The plate part 2 comprises a connecting part 4 for connecting to one or more other plate part(s) (not shown) or to a sensor part (not shown) of a sensor device.

FIG. 3 shows a sensor part 5 of a sensor device. The sensor part comprises a loudspeaker 6, a microphone 7, and a connecting part 4 for connecting the sensor part to one or more plate part(s) (not shown) or to another sensor part (not shown). It further comprises a control panel 8 comprising a number of control buttons 9*a–c*. In this case there are three different control buttons 9*a–c* at the control panel 8, the buttons representing "play" 9*a*, "record" 9*b* and "stop" 9*c*.

FIG. 4 shows a sensor device 10 comprising a plate part 2 and a sensor part 5 being interconnected by a connecting part 4*a*. The plate part 2 comprises another connecting part 4*b* being suitable for establishing a connection between the sensor device 10 shown and another plate part (not shown). At the plate part 2 are arranged eight blocks 1*a–d* belonging two-by-two to four different sub-populations. The blocks 1*a–d* are positioned at different receiving positions 3 of the plate part 2.

The different positions along the "Y" dimension may represent different instruments tracks, and each sub-population represents a certain musical feature. The sensor part 5 determines the position of the blocks 1 and to which sub-population they belong. The sensor part 5 uses this information to create compositions, music arrangements, soundscapes or other musical expressions. When blocks 1 are arranged at and/or removed from different receiving positions 3 the sensor part 5 changes the composition accordingly. The sensor device 10 is operated by means of the control panel 8. The music produced may be played by the loudspeaker 6, and different musical features may be added to the composition or be "assigned" to a certain block 1 positioned at a receiving position 3 having a certain position along the "Y" dimension using the microphone 7.

The configuration of blocks 1 arranged at the plate part 2 shown has repeating elements. The composition shown is as follows. First instrument one (e.g. drums or percussion) plays a certain musical feature twice, indicated by the two blocks 1*a* positioned adjacent one another along the "X" dimension of the lowermost instrument track. Then instrument two (e.g. bass) plays another musical feature twice, indicated by the two blocks 1*b* positioned adjacent one another along the "X" dimension of the second instrument track. The same procedure applies to instrument three (e.g. guitar) and instrument four (e.g. piano). Since there is no temporal overlapping of the blocks 1, i.e. at most one block is present for each position along the "X" dimension, the instruments play their part of the composition alone, i.e. not accompanied by any other instrument.

If a block 1*a* was positioned along the "Y" dimension corresponding to, e.g., instrument two, this would not necessarily indicate that the same musical feature as the drum beat described above should be played by instrument two (in this case the bass). This is because the musical feature depends upon the sub-population to which the block belongs as well as the position of the block along the "Y" dimension. This is in order to limit the number of different sub-populations (i.e. the number of different blocks to be manufactured and administrated) while maintaining the possibility of having a large variety of musical features for each instrument.

FIG. 5 shows a sensor device 10 comprising two plate parts 2*a* and 2*b* and a sensor part 5, the various parts being interconnected by connecting parts 4*a* and 4*b*. Plate part 2*b* further comprises another connecting part 4*c* being suitable for establishing a connection between the sensor device 10 shown and another plate part (not shown). A number of blocks 1*a–d* are arranged at the plate parts 2*a* and 2*b*.

Sensor part 5 and plate part 2*a* are identical to the sensor part 5 and plate part 2 shown in FIG. 4, including the distribution of blocks. By adding plate part 2*b*, the temporal domain of the composition is extended. That is, after the music corresponding to the distribution of blocks arranged on plate part 2*a* has been played as described above, the music corresponding to the distribution of blocks arranged on plate part 2*b* will be played, thereby extending the time in which music is being played.

When comparing the distribution of blocks at plate part 2*a* and the distribution of blocks at plate part 2*b*, it is seen that three more instruments has been added, corresponding to three more instrument tracks (i.e. positions along the "Y" dimension) are being used. It is also seen that at a number of positions along the "X" dimension, more than one block is present in different positions along the "Y" dimension. When this is the case two or more instruments are playing at the same time. Thus, three blocks are arranged on plate part 2*b* in position three of the "X" dimension. This indicates that instrument one, instrument two and instrument six are playing at the same time. Even though the blocks 1*b* arranged in instrument track one and in instrument track six belong to the same sub-population, they do not necessarily represent the same musical feature (e.g. the same harmony or piece of music), since the musical feature represented by each block depends upon the sub-population to which the block belongs as well as upon the position along the "Y" dimension.

FIG. 6 shows four different blocks 1*e*–*h* belonging to four different sub-populations according to another aspect of the invention. Each block 1*e*–*h* comprises activating means 11*e*–*h* for activating the corresponding block 1*e*–*h*.

Block 1*e* is pressure sensitive, i.e. the activating means 11*e* is activated by pressing it in the direction indicated by the arrow. This resembles the key of e.g. a piano, an accordion or a wind instrument.

The activating means 11*f* of block 1*f* comprises a roller which may be rolled as indicated by the arrows. The speed of the rolling movement may be measured, and the block 1*f* may be used to simulate e.g. the bow movement of a bow instrument, such as a violin, a viola or a string bass, or to simulate the striking of a chord on a guitar.

The activating means 11*g* of block 1*g* comprises a string like element which may be moved as indicated by the arrows. The speed of plucks may be measured in order to simulate the movement of strings in a string instrument, such as a guitar, a violin or a string bass.

The activating means 11*h* of block 1*h* comprises a mouthpiece like element which is suitable for receiving air being blown into the activating means 11*h* in the direction indicated by the arrow. It is further suitable for measuring the air pressure of the air being blown into the activating means 11*h* in this manner and for measuring the "bite" pressure. It may be used to simulate the representation of a wind instrument, such as a flute, an oboe or a clarinet. It may alternatively be used to simulate the representation of a brass instrument, such as a trumpet, a trombone or a french horn.

FIG. 7 shows an "instrument" 12 which has been built from one block 1*h* belonging to a first sub-population, three blocks 1*e* belonging to a second sub-population, and one block 1*f* belonging to a third sub-population, the blocks 1*e*–*f* being interconnected so as to form the "instrument" 12. The "instrument" 12 resembles a trumpet with a "mouthpiece" (represented by block 1*h*) and three "keys" (represented by blocks 1*e*). Further, a block 1*f* has been added. This may be used to control different musical features such as pitch bend, modulation, reverberation etc.

FIG. 8 shows the "instrument" 12 of FIG. 7 being connected to the sensor part 5 of a sensor device 10 by means of a connecting part 4*d*. The plate part 2 of the sensor device has blocks 1*a*–*d* arranged on it, the blocks 1*a*–*d* being arranged as in FIG. 4. In this configuration it is possible to let the sensor part 5 of the sensor device 10 play the music corresponding to the blocks 1*a*–*d* arranged on the plate part 2, while the user plays along using the "instrument" 12. This way different musical variations may be tested using the "instrument" 12 while basic musical element (such as the rhythm, chords etc.) are automatically played (and maybe even repeated until the device is turned off) by the sensor device 10, the basic musical elements being played according to the blocks 1*a*–*d* arranged on the plate part 2.

Thus, a device has been provided for composing and arranging music. The device is easy to use, and it may be used as an educational toy. Further, an instrument building device has been provided, the instrument building device being flexible, so as to allow the user to build a known or an unconventional instrument.

What is claimed is:

1. A device for composing and arranging music comprising a sensor device having a plurality of receiving positions arranged in a two-dimensional array of which one dimension represents a temporal domain of the music, a plurality of blocks each being suitable for being releasably arranged at each of the receiving positions, each of the blocks belonging to one of a plurality of sub populations of blocks and having features being detectable by detecting means for detecting to which of the plurality of sub-populations of blocks a block arranged at a receiving position belongs as well as the position of said receiving position and for producing an output accordingly, wherein each block represents a predetermined musical feature, said representation being dependant upon the sub-population to which the block belongs as well as the position of the block on the sensor device along the second dimension of the two-dimensional array, the device further comprising play-back means for playing music according to the detected positions and features of the block(s) arranged at the sensor device as well as according to the predetermined musical features.

2. A device according to claim 1, wherein the detecting means are arranged on the sensor device at each receiving station.

3. A device according to claim 1, wherein the play-back means form a part of the sensor device.

4. A device according to claim 1, further comprising recording means for recording and storing music according to the detected positions and features of the block(s) arranged at the sensor device as well as according to the predetermined musical features.

5. A device according to claim 1, wherein different positions along the second dimension of the two-dimensional array represent different musical instruments.

6. A device according to claim 1, wherein the predetermined features represented by each block is defined for each composition or arrangement of music.

7. A device according to claim 1, wherein the predetermined features of at least some of the blocks are globally determined, and wherein the removal of a certain block results in the removal of the corresponding musical feature from the composition or arrangement.

8. A device according to claim 1, wherein the detecting means comprises means for detecting the resistance of a resistor, the resistance of which being significant of the sub-population to which the block belongs.

9. A device according to claim 1, wherein the sensor device is suitable for being releasably connected to another substantially identical sensor device, so as to allow for an extension of the sensor device in at least one of the two dimensions.

10. A device according to claim 1, wherein each block is suitable for being releasably connected to at least one other block, so that two or more blocks may be positioned at the same receiving position.

11. A device according to claim 10, wherein the presence of two or more blocks at the same receiving position represents an increase in the volume of the predetermined musical feature.

12. A device according to claim 1, further comprising data communication means for establishing a temporary or permanent connection to an external computer device.

13. A device according to claim 12, wherein the external computer device is adapted for converting the musical features represented by the blocks on the sensor device into a graphical presentation of the musical features, the graphical presentation being presented by presenting means connected to the external computer device.

14. A device according to claim 13, wherein the presenting means comprises a monitor.

15. A device according to claim 13, wherein the presenting means comprises a printing device.

16. A device according to claim 12, wherein the external computer device is adapted for being at least temporarily connected to a global computer network.

17. A device according to claim 16, wherein the sensor device is adapted for communicating with another substantially identical sensor device via the global computer network.

18. A device according to claim 1, wherein the produced output is an electrical signal.

19. A device according to claim 1, wherein the produced output is an electromagnetic signal.

20. A device for composing and arranging music comprising a sensor device, a plurality of blocks each belonging to one of a plurality of sub-populations of blocks and having features being detectable by detecting means arranged at the sensor device for detecting to which of the plurality of sub-populations of blocks a block being connected to said sensor device belongs and for producing an output accordingly, each block being suitable for being releasably connected to at least one other block, at least one connecting part for connecting one or more blocks to the sensor device, so as to transfer information relating to the block(s) from the block(s) to the sensor device, wherein each block represents a predetermined musical feature, said representation being dependant upon the sub-population to which the block belongs and each block comprises activating means, the device further comprising play-back means for playing music according to the detected features of the block(s) connected to the sensor device as well as according to the predetermined musical features.

21. A device according to claim 20, wherein two or more blocks being connected to each other and to the sensor device constitutes a musical instrument, each block representing a key of the instrument, the key being activated when the activating means of the corresponding block is activated.

22. A device according to claim 20, further comprising data communication means for establishing a temporary or permanent connection to an external computer device.

23. A device according to claim 22, wherein the external computer device is adapted for converting the musical features represented by the blocks connected to the sensor device into a graphical presentation of the musical features, the graphical presentation being presented by presenting means connected to the external computer device.

24. A device according to claim 23, wherein the presenting means comprises a monitor.

25. A device according to claim 23, wherein the presenting means comprises a printing device.

26. A device according to claim 22, wherein the external computer device is adapted for being at least temporarily connected to a global computer network.

27. A device according to claim 26, wherein the sensor device is adapted for communicating with another substantially identical sensor device via the global computer network.

28. A device according to claim 20, wherein the produced output is an electrical signal.

29. A device according to claim 20, wherein the produced output is an electromagnetic signal.

* * * * *